United States Patent
Langkamp

(10) Patent No.: US 9,027,853 B2
(45) Date of Patent: May 12, 2015

(54) MULTIPLE NOZZLE BODY

(75) Inventor: Laurenz Langkamp, Tecklenburg (DE)

(73) Assignee: Amazonen-Werke H. Dreyer GmbH & Co. KG, Hasbergen (DE)

( * ) Notice: Subject to any disclaimer, the term of this patent is extended or adjusted under 35 U.S.C. 154(b) by 151 days.

(21) Appl. No.: 13/807,527

(22) PCT Filed: May 9, 2011

(86) PCT No.: PCT/EP2011/002305
§ 371 (c)(1),
(2), (4) Date: Mar. 12, 2013

(87) PCT Pub. No.: WO2012/007074
PCT Pub. Date: Jan. 19, 2012

(65) Prior Publication Data
US 2013/0168473 A1    Jul. 4, 2013

(30) Foreign Application Priority Data
Jul. 16, 2010   (DE) .......................... 10 2010 036 437

(51) Int. Cl.
| A62C 31/00 | (2006.01) |
| B05B 1/16 | (2006.01) |
| F16K 31/524 | (2006.01) |
| F16K 11/16 | (2006.01) |

(52) U.S. Cl.
CPC ............ *B05B 1/1672* (2013.01); *B05B 1/1609* (2013.01); *F16K 31/52416* (2013.01); *F16K 31/52425* (2013.01); *F16K 11/166* (2013.01)

(58) Field of Classification Search
CPC .. B05B 1/1672; B05B 1/1609; B05B 1/1636; F16K 11/166; F16K 31/52416; F16K 31/52425
USPC .................. 239/443, 444, 446, 581.1
See application file for complete search history.

(56) References Cited

U.S. PATENT DOCUMENTS

| 2,461,617 A * | 2/1949 | Waters .......................... 251/340 |
| 3,186,433 A | 6/1965 | Bills et al. |
| 2002/0179164 A1 | 12/2002 | Hashimoto |

FOREIGN PATENT DOCUMENTS

| DE | 7812539 U1 | 8/1978 |
| EP | 1661627 A1 | 5/2006 |
| EP | 1821017 A2 | 8/2007 |
| FR | 1273952 A | 10/1961 |
| FR | 2057131 A5 | 5/1971 |
| GB | 576287 A | 3/1946 |

* cited by examiner

OTHER PUBLICATIONS

International Search Report for PCT/EP2011/002305, mailing date of Sep. 21, 2011.

*Primary Examiner* — Christopher Kim
(74) *Attorney, Agent, or Firm* — Marshall, Gerstein & Borun LLP

(57) ABSTRACT

A multiple nozzle body including a plurality of discharge nozzles for arranging on the liquid line of an agricultural crop sprayer, wherein the liquid line can be connected to the supply line of the multiple nozzle body, wherein the supply line opens out in a distribution space, wherein a plurality of connecting lines that respectively lead to a discharge nozzle branch off from the distribution space, wherein a shut-off element that is respectively assigned to a connecting line and is formed as a shut-off valve is assigned to the distribution space, wherein one or more connecting lines can be optionally connected to and/or shut off from the supply line by means of the shut-off element of the shut-off valves, which can be actuated by means of a switchable actuating element.

6 Claims, 5 Drawing Sheets

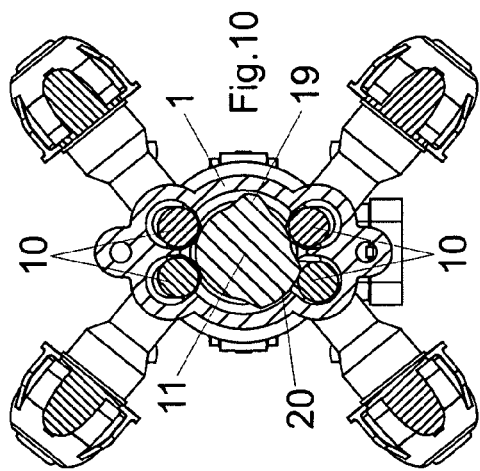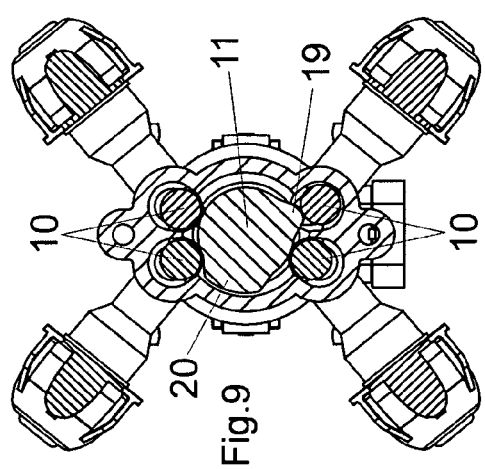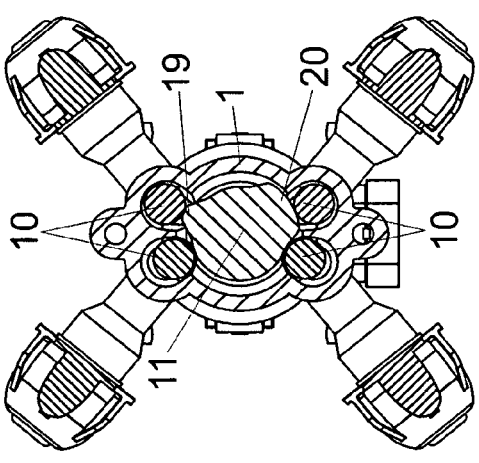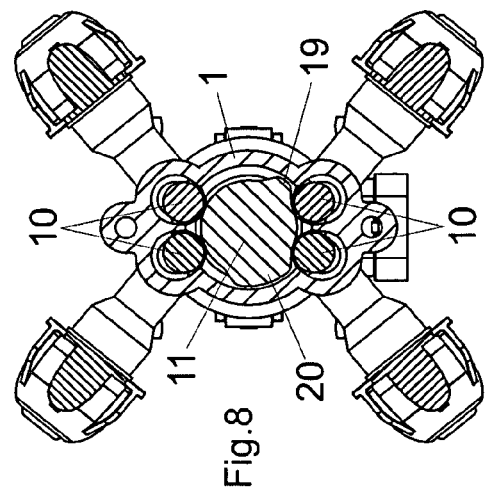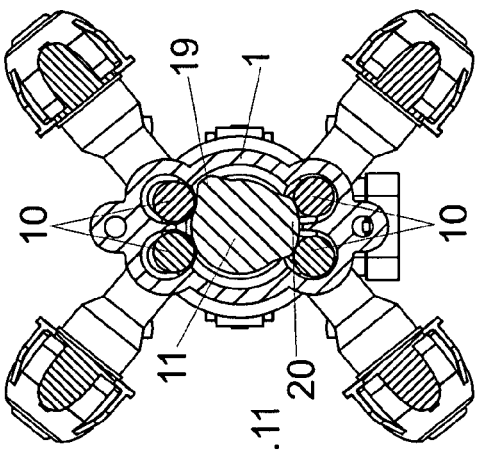

MULTIPLE NOZZLE BODY

CROSS-REFERENCE TO RELATED APPLICATION

The present application is the United States national phase of International Patent Application No. PCT/EP2011/002305, filed May 9, 2011, which application claims priority of German Application No. 102010036437.1, filed Jul. 16, 2010. The entire text of the priority application is incorporated herein by reference in its entirety.

FIELD OF THE DISCLOSURE

The disclosure relates to a multiple nozzle body such as for use with an agricultural crop sprayer.

BACKGROUND

Such a multiple nozzle body is known, for example, from German utility model 78 12 539 U1. This multiple nozzle body has a shut-off element embodied as three-way valve. By means of this three-way valve, the connecting lines leading to the discharge nozzles can be optionally connected to or shut off from the supply line. The potential connection options are here very restricted. Furthermore, the three-way valve can only be adjusted with a relatively high expenditure of force as the frictional forces caused by the seal are relatively high.

Another multiple nozzle body is known from EP 1 661 627 B1. Different connecting lines leading to discharge nozzles can be connected to a supply line via a selector valve embodied as ball valve. Here, too, the potential connection options are restricted.

SUMMARY OF THE DISCLOSURE

One aspect of the disclosure is to provide a multiple nozzle body with a shut-off element that can be adjusted with low adjusting forces and has a compact design and versatile adjusting facilities.

According to the disclosure, this is achieved by the actuating element comprising a plurality of switching cams and being turnable into different switching positions about an axis of rotation, the shut-off elements being of a spherical form and being arranged in a sealing manner in their shut-off positions in a valve seat having a sloping annular portion, the spherical shut-off elements being movable in an at least approximately perpendicular direction in relation to the axis of rotation of the actuating element over the sloping walls of the annular portion of the valve seat out of the valve seat into a position releasing the throughflow to the respective connecting line.

As a result of these measures, an extremely compact multiple nozzle body is obtained whose valves embodied as spherical shut-off elements can be adjusted with low adjusting forces. The spherical shut-off elements can be shifted out of their valve seats into a position releasing the throughflow in the connecting line with low forces by the spherical elements rolling up the oblique walls of the annular portion of the valve seat.

An advantageous arrangement of the supply line to the connecting lines with a compact design of the multiple nozzle body is achieved by the inlet opening of the supply line being arranged in the distribution space offset with respect to the branch-off openings of the connecting lines comprising a valve seat.

A very simple embodiment of the actuating element can be achieved by the actuating element having a disk-like design.

To be able to connect one or several connecting lines simultaneously to the supply line, it is provided for the actuating element to comprise at least two switching cams. Thereby, one or several discharge nozzles can be activated simultaneously, i.e. the liquid to be discharged is discharged by one or several discharge nozzles.

In one embodiment, at least one of the two switching cams of the actuating element is designed such that two adjacent shut-off elements can be simultaneously moved to a position releasing the throughflow in the connecting line. Thereby, two directly adjacent connecting lines can thus be simultaneously connected to the supply line in a simple manner.

To be able to adjust the shut-off valves of the multiple nozzle body in a simple manner by means of remote adjustment or on-board computers, the actuating element is rotatable by means of a motive actuator.

A simple embodiment of the valve elements can be achieved by the spherical valve elements being embodied as spheres and being capable of being pressed into their valve seats into a sealing position by means of pressure springs.

BRIEF DESCRIPTION OF THE DRAWINGS

Further details of the disclosure can be taken from the description of examples and the drawings. In the drawings FIG. 8 shows an adjustment position of the actuating element for actuating the shut-off valves in the representation according to FIG. 3, all valve bodies being in their shut-off positions, FIG. 9 shows a further adjustment position of the actuating element for actuating the shut-off valves in the representation according to FIG. 3, one valve body being in its throughflow position, FIG. 10 shows a further adjustment position of the actuating element for actuating the shut-off valves in the representation according to FIG. 3, one valve body being in its throughflow position, FIG. 11 shows a further adjustment position of the actuating element for actuating the shut-off valves in the representation according to FIG. 3, two valve bodies being in their throughflow positions, and FIG. 12 shows a further adjustment position of the actuating element for actuating the shut-off valves in the representation according to FIG. 3, two valve bodies being in their throughflow positions.

DETAILED DESCRIPTION OF THE PREFERRED EMBODIMENT

Figure 1:
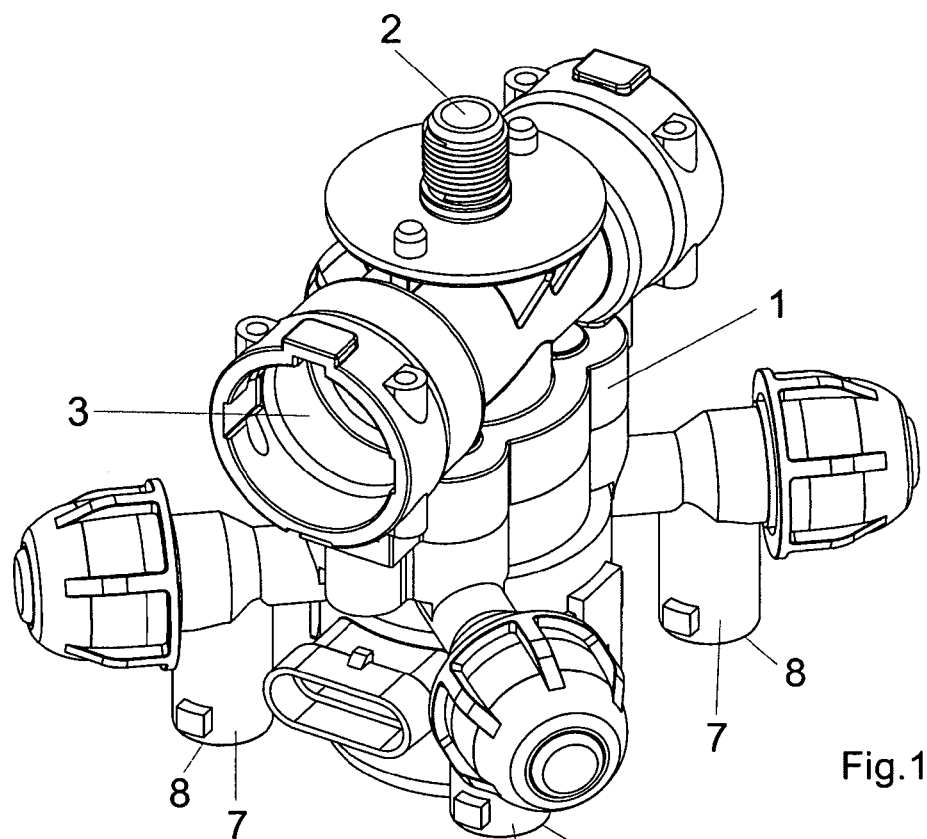
FIG. 1 shows the multiple nozzle body in a perspective view.
Figure 2:
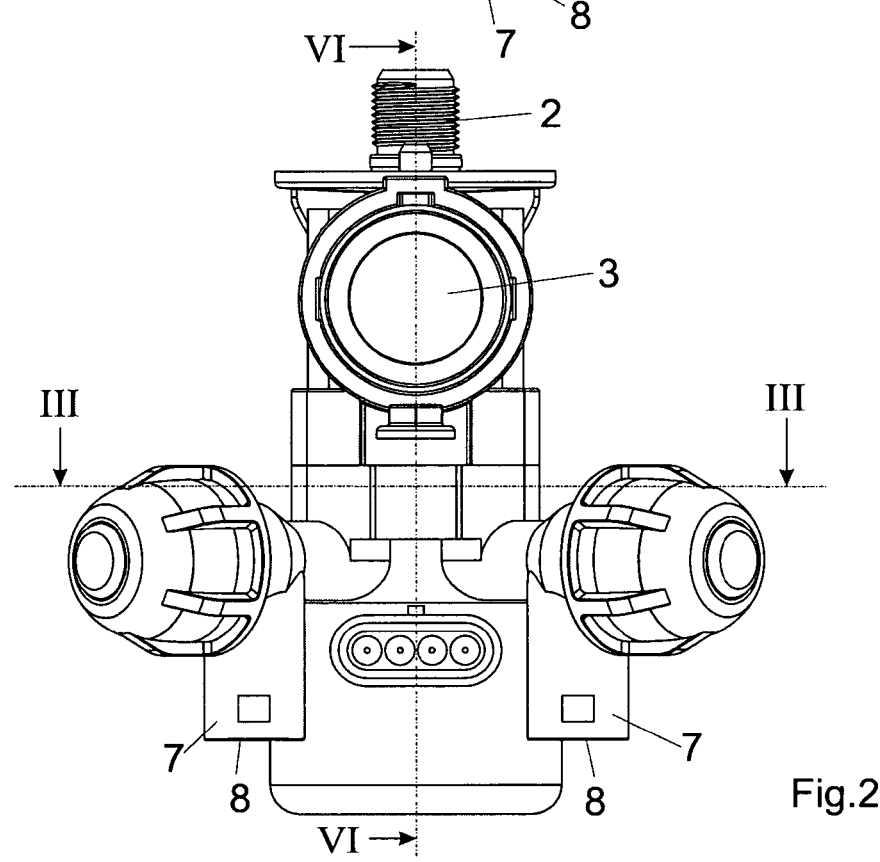
FIG. 2 shows the multiple nozzle body in a side view.

The multiple nozzle body comprises the housing 1. The fastening means 2 by which the multiple nozzle body can be fixed to frame elements, distributor rods, etc. is disposed at the housing. In the upper region of the housing 1 of the multiple nozzle body, a part 3 of the liquid line is arranged to which the multiple nozzle body can be connected. Via this liquid line, which is, for example, disposed at a distributor rod of an agricultural crop sprayer (neither shown), the liquid to be discharged can be supplied to the respective multiple nozzle body.

The liquid line 3 is connected to the supply line 4 disposed in the housing 1. The supply line 4 ends in the distribution space 5 disposed in the housing 1. According to the embodiment, four connecting lines 6 lead from this distribution space 5 to discharge lines 7 arranged in the housing 1 at the ends 8 of which discharge nozzles are arranged in a well-known manner by means of cap nuts, which is not shown.

The connecting lines 6 can be shut off in the region of the distribution space 5 by means of shut-off elements embodied as shut-off valves 9. Via these shut-off valves 9, the connecting lines 6 can be optionally connected to the supply line 4 and/or shut off from it. The shut-off valves 9 can be actuated via switchable actuating elements 11 and thus be brought into the respective shut-off or throughflow position.

The inlet opening 12 of the supply line 4 is disposed in the distribution space 5 offset to the branch-off openings 14 of the connecting lines 6 comprising a valve seat 13.

The shut-off valves 9 each have a valve seat 13 disposed in the housing 1 which each has a sloping annular portion 16 due to the embodiment of oblique walls 15. The shut-off elements 10 are of a spherical form, in the embodiment they are designed as spheres. When the spheres 10 are located in the sloping annular portion 16 of the valve seat 13, they cooperate with the sloping annular portion 16 of the valve seat 13 in a sealing manner in this shut-off position. Pressure springs 17 are assigned to the spheres 10 by means of which the latter are pressed towards the valve seat 13.

Figure 3:
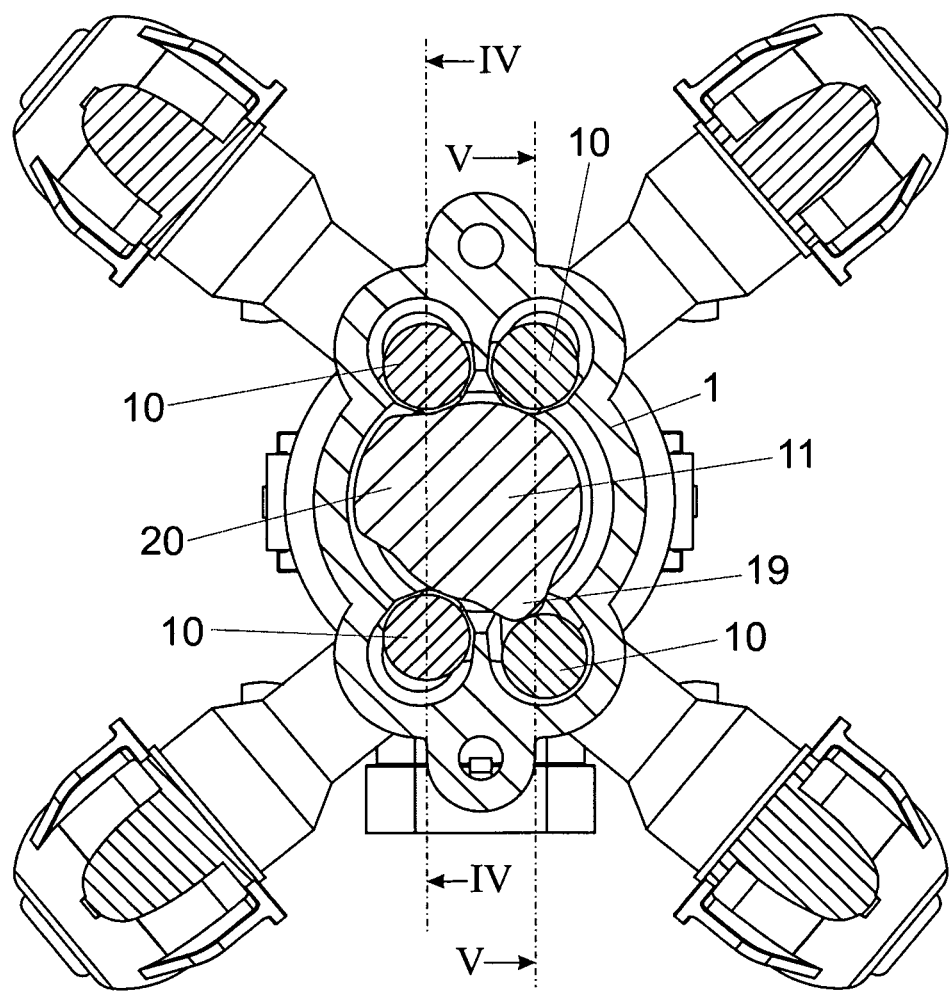
FIG. 3 shows the multiple nozzle body in the view III-III.
Figure 4:
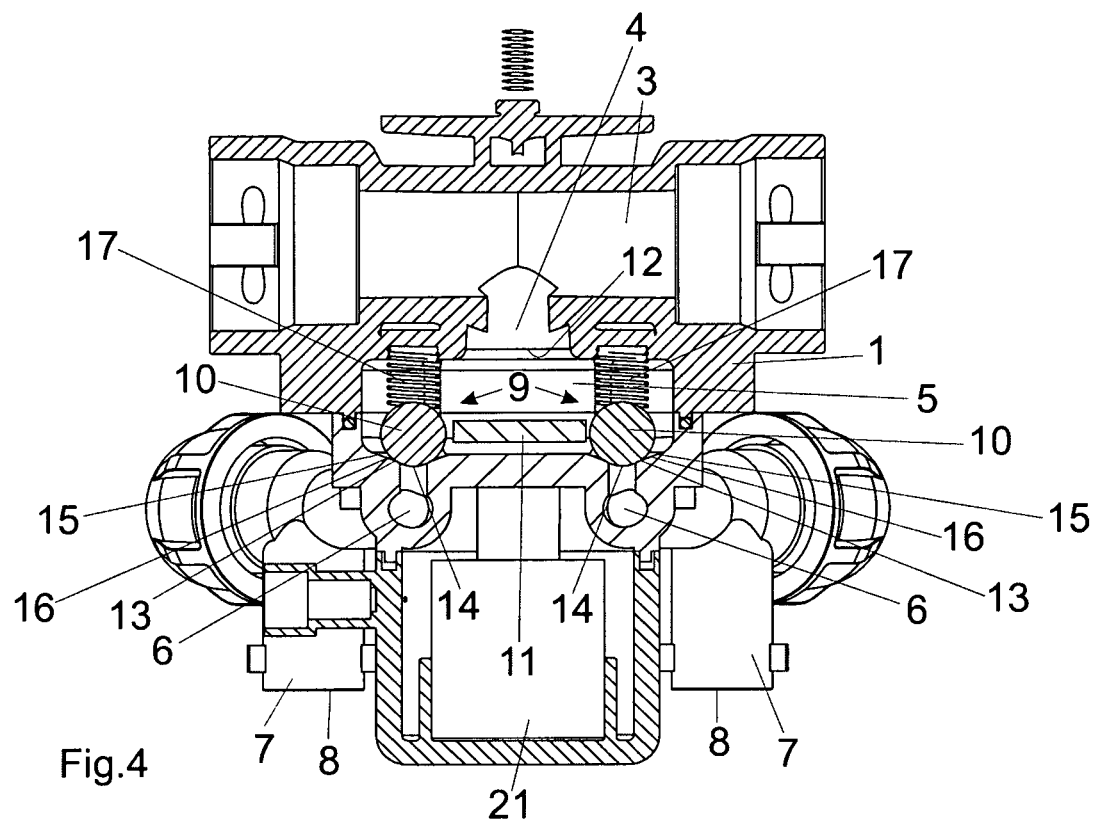
FIG. 4 shows the multiple nozzle body in the view IV-IV.

The switchable actuating element 11 has a disk-like design and is connected to a selector shaft 18 mounted in the housing 1 in a torque-proof manner. The actuating element 11 has several switching cams 19, 20 as shows FIG. 3. According to the embodiment, the actuating element 11 has two switching cams 19, 20. The selector shaft 18 of the actuating element 11 is connected to a motive actuator 21 embodied as electric motor in a torque-proof manner and can thus be rotated about its axis of rotation 22 via the motive actuator 21.

One of the two switching cams 19 is embodied such that it can only press one valve element designed as a sphere 10 out of the valve seat 13, so that the throughflow to one connecting line 6 is released. The other one of the two switching cams 20 is embodied such that it can simultaneously move two adjacent shut-off elements designed as spheres 10 to a position releasing the throughflow into the respective connecting lines 6, i.e. it can simultaneously press two valve elements designed as spheres 10 out of their valve seats 13.

The actuating element 11 with the two switching cams 19, 20 can be rotated to different positions as is represented in FIGS. 8 to 12 for some possible positions. As is obvious, depending on the switching position of the actuating element 11, the throughflow can be released for no, one or several connecting lines 6 to the discharge lines 7 leading to the discharge nozzles. Thus, the liquid to be discharged can be optionally supplied to no, one or several connecting lines and thus discharge nozzles in different combinations.

Figure 5:
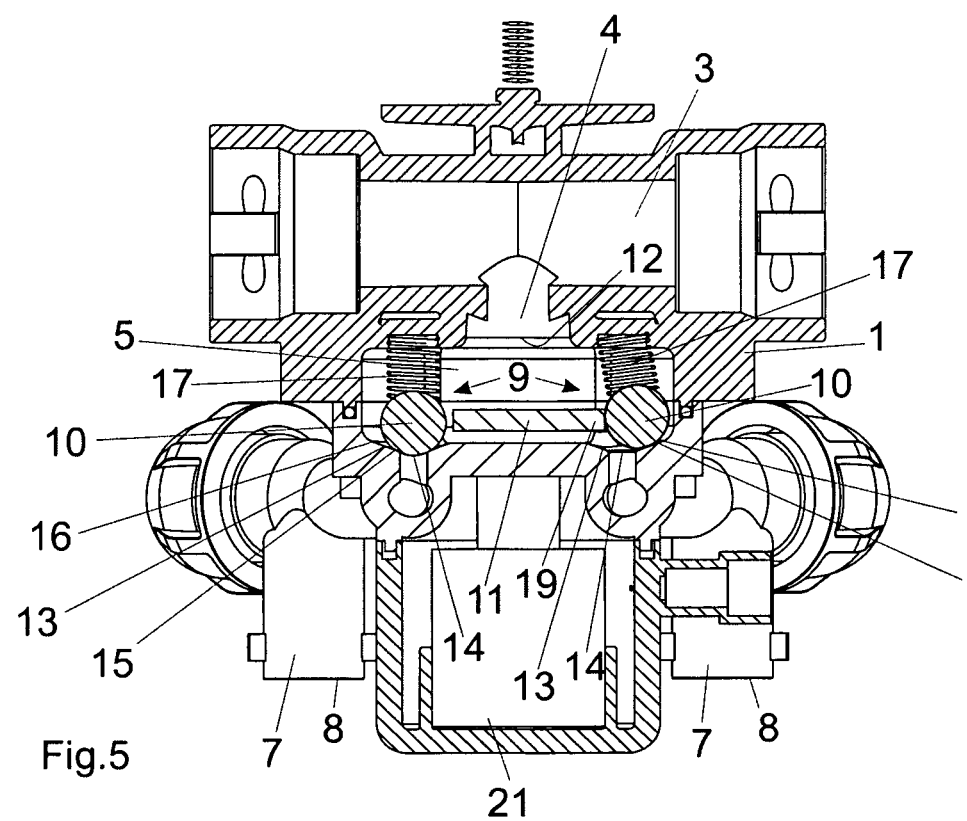
FIG. 5 shows the multiple nozzle body in the view V-V.
Figure 6:
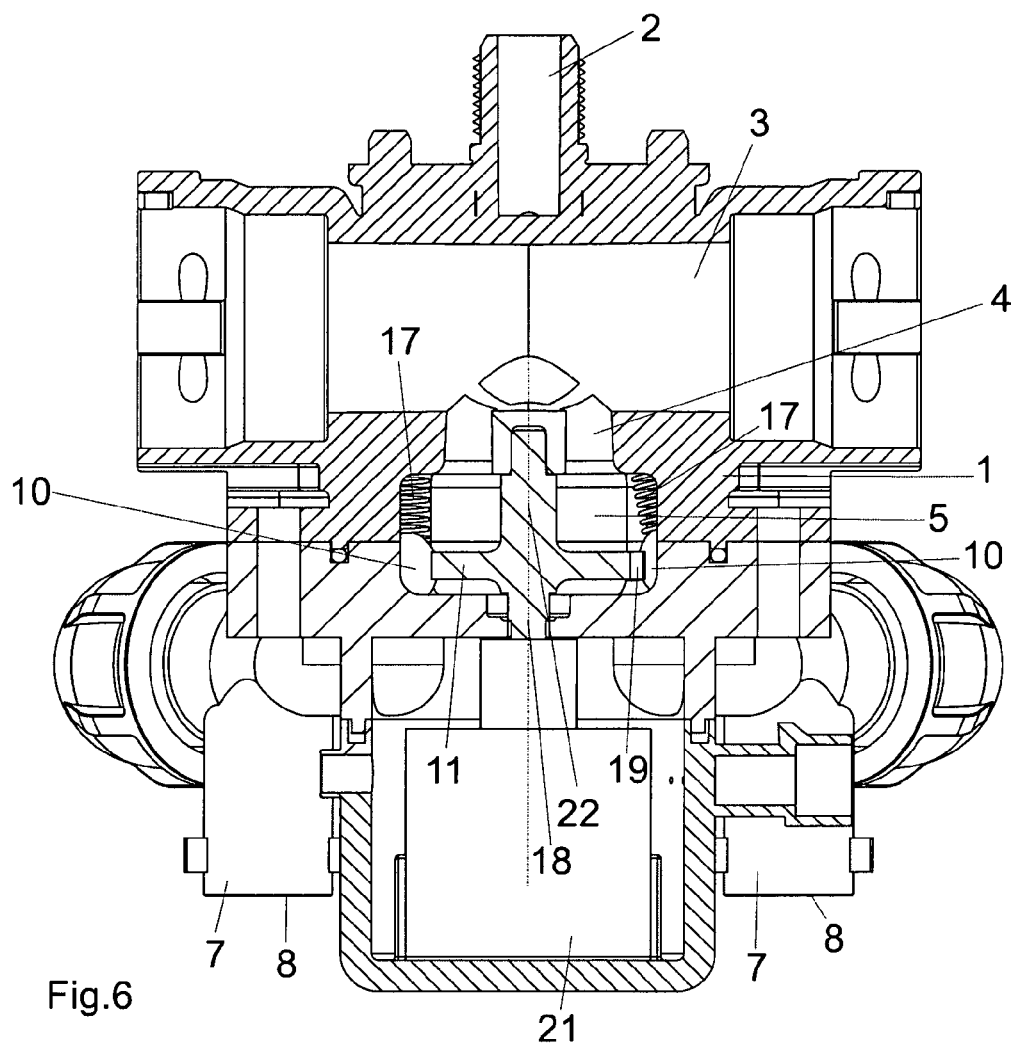
FIG. 6 shows the multiple nozzle body in the view VI-VI.
Figure 7:
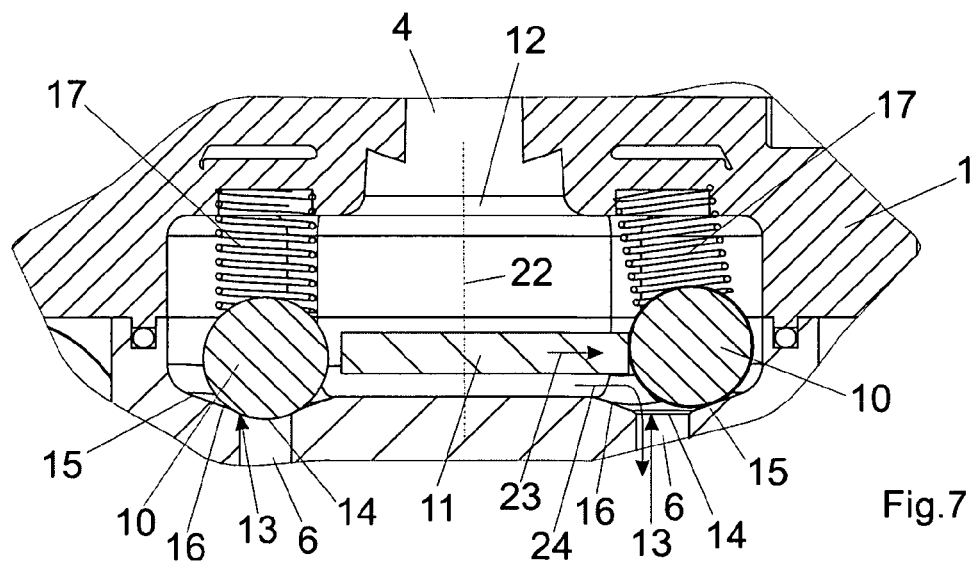
FIG. 7 shows the valve body with the valve seat of the shut-off elements in the view according to FIG. 5, some details being shown enlarged.

The switching cams 19, 20 of the disk-like actuating element 11 act upon the spheres 10 in a direction 23 approximately perpendicular to the axis of rotation 22 of the actuating element 11 approximately at the height of the center of the spheres 10 of the shut-off valves 9 and press them into the direction 23 perpendicular to the axis of rotation 22 over the oblique walls 15 of the annular portion 16 of the respective valve seat 13 out of the valve seat 13 into a position releasing the throughflow, as indicated by arrow 24, to the respective connecting line 6, as is drawn in the situation represented in FIGS. 5 and 7 for the right sphere 10 in this figure.

The respective motive adjustment element 21 which is embodied as electric motor is connected, via not represented connecting lines, to a power supply and a control device, which can be embodied, for example, as on-board computer.

The invention claimed is:

1. A multiple nozzle body, comprising a plurality of discharge nozzles to be arranged at a liquid line of an agricultural crop sprayer, a supply line for the multiple nozzle body adapted to connect to the liquid line, the supply line opening in a distribution space, a plurality of connecting lines each leading to one of the plurality of discharge nozzles and branching off, via a branch-off opening, from the distribution space, in the distribution space each of the plurality of connecting lines is assigned a shut-off element formed as a shut-off valve, one or more of the plurality of connecting lines is selectively connected to or shut off from the supply line by means of the respective shut-off element, the shut-off elements being actuatable by means of a switchable actuating element, the actuating element including a plurality of switching cams and turnable about an axis of rotation into different switching positions, the shut-off elements being of a spherical form thereby forming spherical shut-off elements and in their sealing position arranged in a valve seat which comprises a sloping annular portion and is arranged at the respective branch-off opening of the respective connecting line, and the spherical shut-off elements movable by one or more of the plurality of switching cams in an at least approximately perpendicular direction to the axis of rotation of the actuating element and in an at least approximately parallel direction to the respective branch-off opening over an oblique wall of the sloping annular portion of the valve seat out of the valve seat into a position releasing the throughflow to the respective connecting line.

2. The multiple nozzle body according to claim 1, and an inlet opening of the supply line is arranged in the distribution space offset to the branch-off openings of the plurality of connecting lines.

3. The multiple nozzle body according to claim 1, and the actuating element has the shape of a disk, the plurality of switching cams being arranged at the circumference of the disk.

4. The multiple nozzle body according claim 1, and at least one of the plurality of switching cams of the actuating element is designed such that two adjacent shut-off elements can be simultaneously moved to a position releasing the throughflow in the connecting line.

5. The multiple nozzle body according claim 1, and the actuating element can be turned by means of a motive actuator.

6. The multiple nozzle body according to claim 1, and the spherical shut-off elements each comprise spheres and can be pressed into their respective valve seats into the shut-off position by means of pressure springs.

* * * * *